Patented Sept. 6, 1932

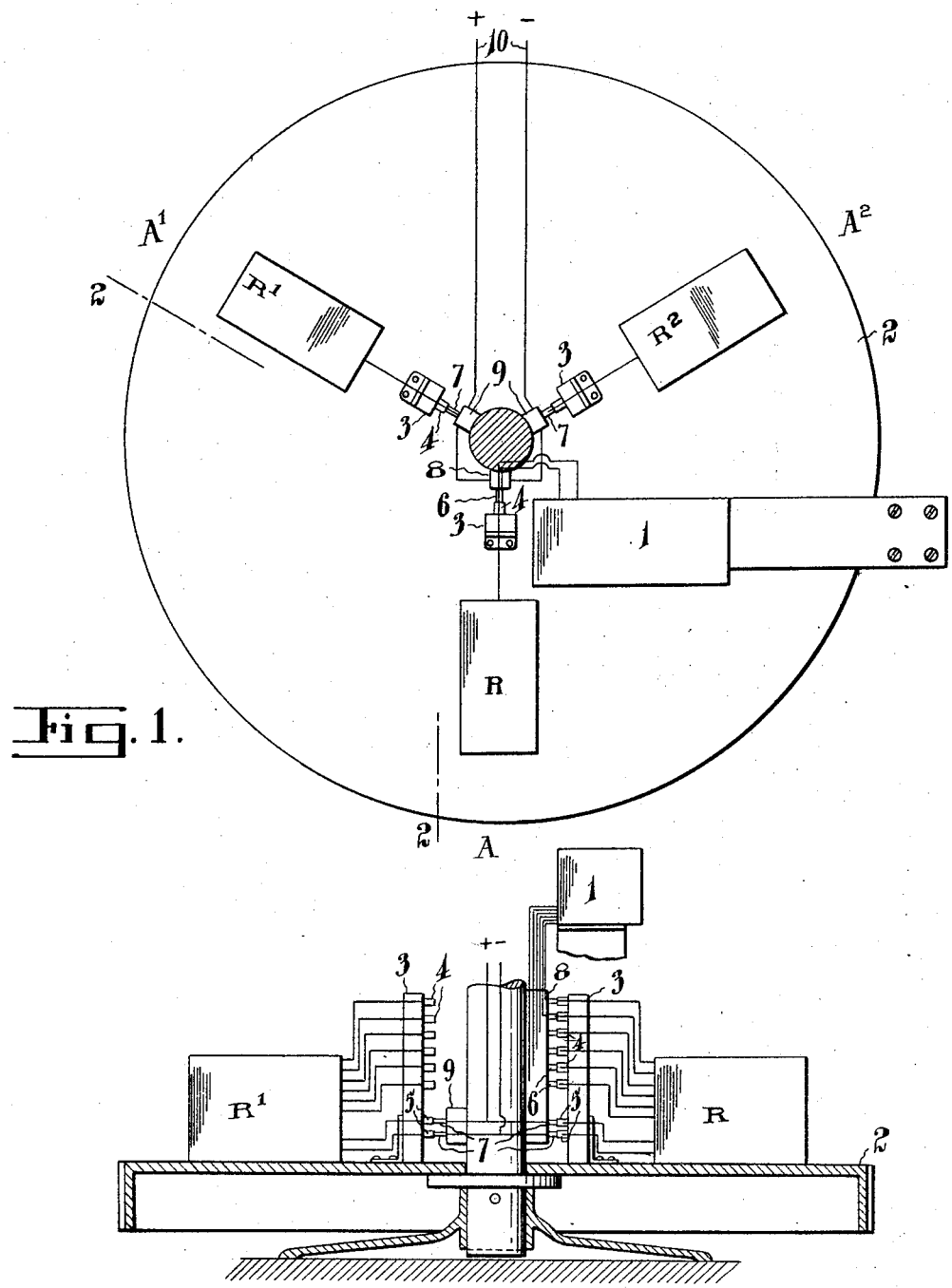

1,875,624

UNITED STATES PATENT OFFICE

CHARLES A. LOWRY, OF TORONTO, ONTARIO, CANADA, ASSIGNOR TO DE FOREST CROSLEY RADIO COMPANY, LIMITED, OF TORONTO, ONTARIO, CANADA

SYSTEM OF AND APPARATUS FOR TESTING RADIORECEIVERS

Application filed September 29, 1930. Serial No. 485,083.

This invention relates to a system of and apparatus for testing radio-receivers, particularly the sensitivity thereof. Heretofore it has been the common practice to test a number of radio-receivers by laboratory testing apparatus and use these receivers as test or sub-standards for testing the receivers in production. In other words, each of the test-standard or sub-testing receivers was used as a basis for comparison between it and a receiver being "tested". This system not only necessitated a large staff of testers in proportion to the number employed to manufacture the receivers but the results, due to varying conditions in each of the test-standard receivers and thus relative to one another without bringing in the human element which entered into the tests under the above conditions, were unsatisfactory. Another of the objections to this system was the large number of matched sets of radio-tubes required for each tester. The object of the present invention is to provide a system for testing receivers which will overcome the above objectionable features so that the results will be standardized and quickly attainable.

I attain my object by providing means whereby one operator may do all the testing by laboratory apparatus. That is to say the laboratory apparatus, which was formerly used to test receivers which subsequently served as sub-standards for "testing" the receivers in production, is now used for testing the latter and means is provided so that the laboratory apparatus may be so used on a commercial basis for high speed production. The said means includes any suitable type of carrier on which are mounted a plurality of sets of testing and tube-heating terminals. The sets of testing terminals are adapted to be electrically connected, one set at a time, with a set of testing contacts which are connected with the testing apparatus. The sets of tube-heating terminals are adapted to be electrically connected with a corresponding number of sets of tube-heating contacts when a set of testing terminals is engaged with the set of testing contacts. The sets of tube-heating contacts are connected with any suitable source of energy whereby while one receiver is being tested one or more fresh receivers may be connected with a corresponding number of sets of testing and tube-heating terminals on the carrier to condition the tubes thereof for conducting subsequent tests of the last mentioned receivers. When the test of each receiver is completed the carrier is actuated to move the tested receiver out of testing position and to bring a receiver having its tubes previously conditioned for operation into testing position. The tested receiver is disconnected from the terminals on the carrier and a fresh receiver is connected therewith.

The constructions are hereinafter more fully described and are illustrated in the accompanying drawing in which Fig. 1 is a diagrammatic plan view illustrating the method of connecting the receivers with the terminals, the testing contacts with the testing apparatus and the tube-heating contacts with a source of power; and Fig. 2 a diagrammatic view in section on the line 2—2 in Fig. 1.

In the drawing like numerals of reference indicate corresponding parts in the different figures.

1 is a standard signal generator which is a well-known type of apparatus for testing radio-receivers in a laboratory where each receiver to be tested is individually connected with the apparatus and the tubes of each receiver are heated when the receiver is positioned and connected for testing. To condition the tubes of a receiver for operation in conducting a test of the receiver and to effect a high speed connection of the receiver with the testing apparatus I provide a carrier 2 on which is mounted a plurality of blocks 3. Each block has a set 4 of testing terminals and a set 5 of tube-heating terminals, which sets of terminals are connected with a receiver R. The blocks are spaced apart on the carrier and the set 4 of testing terminals carried by each block is adapted to be brought into and out of electrical engagement with a set 6 of testing contacts connected with the testing apparatus 1. The sets 5 of tube-heating terminals are adapted for electrical engagement with a corresponding number of sets 7 of tube-heating contacts. The set 6 of testing contacts is mounted on a stationary block 8 which also carries one of the sets 7 of tube-heating contacts. The other set or sets 7 may be carried on stationary blocks 9 which are so spaced that all the sets 7 will be engaged with all the sets 5 at the same time. A suitable source of electrical supply is connected by the wires 10 with the different sets 7 of tube-heating contacts.

Referring to Fig. 1, the receiver R at point or station A is being tested and the receiver at each of the stations A, A' and A² is connected with a set 4 of testing terminals and has its tubes connected with a set 5 of tube-heating terminals. Only the set 4 positioned at station A is connected with the set 6 of testing contacts but all the sets 5 of tube-heating terminals are connected with the sets 7 of tube-heating contacts. The tubes of the receivers R' and R² at stations A' and A² are thus being heated and which ever one of these receivers was hooked up first will be tested next. Assuming the tubes of receiver R' now at station A' are first to be conditioned for conducting a test and that the test of receiver R now at station A is completed, the carrier 2 is turned to bring the receiver R' to station A and the receiver R to station A². While the receiver R' is being tested, the tubes of receiver R are placed in a fresh receiver, the receiver R is removed from the carrier and the fresh receiver is connected with the sets 4, 5 of terminals to which the receiver R was connected. During this time the tubes of receiver R² are conditioned for making the next test so that when the test of receiver R' is completed, receiver R² will be moved to station A.

From this description it is obvious that all receivers are tested by a standard testing apparatus and that the tests are made by one tester with a minimum number of matched sets of radio-tubes which results in uniform tests under practically laboratory testing conditions.

What I claim as my invention is:

1. Apparatus for testing radio-receivers comprising a movable carrier adapted to support a plurality of radio-receivers in different positions for successive delivery to a testing position; a set of tube-heating terminals supported by the carrier at each of the said positions and adapted for connection to the filament circuit of a receiver; a set of testing terminals supported by the carrier at each of the said positions and adapted for connection to the other circuits of a receiver to be tested; a stationary part; contacts carried by said part positioned in a circuit for a tube-heating current and engageable with the tube-heating terminals simultaneously; and a set of testing contacts carried by said stationary part at the testing position connectable with a testing instrument, and making contact with one set of testing terminals while all the sets of tube-heating terminals are engaged with their tube-heating contacts.

2. Apparatus for testing radio-receivers comprising a movable carrier adapted to support a plurality of radio-receivers in different positions for successive delivery to a testing position; a set of tube-heating terminals supported by the carrier at each of the said positions and adapted for connection to the filament circuit of a receiver; a set of testing terminals supported by the carrier at each of said positions and adapted for connection to the circuit of a receiver to be tested; a stationary part; sets of contacts carried by said part, positioned in a circuit for a tube-heating current and engageable with the respective tube-heating terminals simultaneously; and a set of testing contacts carried by the said stationary part at the testing position connectable with a testing instrument and making contact with one set of testing terminals while all the sets of tube-heating terminals are engaged with their respective contacts.

Signed at Toronto, Canada, this 23rd day of August, 1930.

CHARLES A. LOWRY.